US012634629B2

(12) United States Patent
Kaetel

(10) Patent No.: US 12,634,629 B2
(45) Date of Patent: May 19, 2026

(54) MICROPHONE, METHOD FOR RECORDING AN ACOUSTIC SIGNAL, REPRODUCTION APPARATUS FOR AN ACOUSTIC SIGNAL OR METHOD FOR REPRODUCING AN ACOUSTIC SIGNAL

(71) Applicant: Kaetel Systems GmbH, Munich (DE)

(72) Inventor: Klaus Kaetel, Munich (DE)

(73) Assignee: KAETEL SYSTEMS GMBH, Munich (DE)

( * ) Notice: Subject to any disclaimer, the term of this patent is extended or adjusted under 35 U.S.C. 154(b) by 272 days.

(21) Appl. No.: 18/352,685

(22) Filed: Jul. 14, 2023

(65) Prior Publication Data

US 2023/0362545 A1 Nov. 9, 2023

Related U.S. Application Data

(63) Continuation of application No. PCT/EP2022/051252, filed on Jan. 20, 2022.

(30) Foreign Application Priority Data

Jan. 21, 2021 (DE) ......................... 102021200555.1

(51) Int. Cl.
*H04R 1/08* (2006.01)
*H04R 7/02* (2006.01)

(52) U.S. Cl.
CPC ................. *H04R 7/02* (2013.01); *H04R 1/08* (2013.01)

(58) Field of Classification Search
CPC .................................... H04R 7/02; H04R 1/08
See application file for complete search history.

(56) References Cited

U.S. PATENT DOCUMENTS

2008/0199023 A1* 8/2008 Kantola ................. H04R 5/027 381/186
2013/0142358 A1 6/2013 Schultz et al.
(Continued)

FOREIGN PATENT DOCUMENTS

CN 1620839 A 5/2005
DE 10 2013 221 752 A1 4/2015
(Continued)

OTHER PUBLICATIONS

International Search Report and Written Opinion dated May 12, 2022, issued in application No. PCT/EP2022/051252.
(Continued)

*Primary Examiner* — Suhan Ni
(74) *Attorney, Agent, or Firm* — McClure, Qualey & Rodack, LLP

(57) ABSTRACT

Microphone having: a first partial microphone with a first diaphragm pair having a first diaphragm and a second diaphragm that are arranged opposite each other; and a second partial microphone with a second diaphragm pair having a third diaphragm and a fourth diaphragm that are arranged opposite each other, wherein the first diaphragm pair is arranged such that the first diaphragm and the second diaphragm are deflectable along a first spatial axis, wherein the second diaphragm pair is arranged such that the third diaphragm and the fourth diaphragm are deflectable along a second spatial axis and wherein the second spatial axis differs from the first spatial axis.

11 Claims, 12 Drawing Sheets

(56) References Cited

U.S. PATENT DOCUMENTS

| | | | | |
|---|---|---|---|---|
| 2016/0241962 | A1 | 8/2016 | Kaetel | |
| 2016/0241963 | A1 | 8/2016 | Kaetel | |
| 2019/0297422 | A1 | 9/2019 | Anderson | |
| 2023/0362545 | A1 * | 11/2023 | Kaetel .................... | H04R 1/406 |

FOREIGN PATENT DOCUMENTS

| | | | |
|---|---|---|---|
| DE | 10 2013 221 754 | A1 | 4/2015 |
| EP | 3 061 266 | | 8/2016 |
| EP | 2 692 144 | B1 | 2/2017 |
| EP | 2 692 154 | B1 | 9/2017 |
| EP | 2 692 151 | B1 | 1/2018 |
| EP | 3 061 262 | B1 | 1/2018 |
| GB | 2575492 | A | 1/2020 |
| WO | 03/063545 | A1 | 7/2003 |
| WO | 2016/096021 | A1 | 6/2016 |

OTHER PUBLICATIONS

Politis, A., et al.; "Parametric Spatial Audio Effects;" 15th Int. Conference on Digital Audio Effects (DAFx-12); Sep. 2012; pp. 1-8.

Pullki, V., et al.; "Directional audio coding—perception-based reproduction of spatial sound;" International Workshop on the Principles and Applications of Spatial Hearing, IWPASH; Nov. 2009; pp. 1-5.

Denon; "AVC-X3700H 9.2-Kanal 8K AV-Receiver mit 3D-Audio | Denon(TM);" Jul. 2020; pp. 1-10 https://www.denon.com/de-de/product/av-receivers/avc-x3700h.

Wikipedia; "Gleichtaktsignal;" pp. 1-3 https://de.wikipedia.org/wiki/Gleichtaktsignal English Version—"Common-mode signal", https://en.wikipedia.org/wiki/Common-mode_signal.

Wikipedia; Schall; pp. 1-5 https://de.wikipedia.org/wiki/Schall English Version—"Sound", https://en.wikipedia.org/wiki/Sound.

* cited by examiner

MICROPHONE, METHOD FOR RECORDING AN ACOUSTIC SIGNAL, REPRODUCTION APPARATUS FOR AN ACOUSTIC SIGNAL OR METHOD FOR REPRODUCING AN ACOUSTIC SIGNAL

CROSS-REFERENCE TO RELATED APPLICATIONS

This application is a continuation of copending International Application No. PCT/EP2022/051252, filed Jan. 20, 2022, which is incorporated herein by reference in its entirety, and additionally claims priority from German Application No. 102021200555.1, filed Jan. 21, 2021, which is also incorporated herein by reference in its entirety.

TECHNICAL FIELD

The present invention relates to the field of electroacoustics and in particular to concepts for recording and reproducing acoustic signals.

BACKGROUND OF THE INVENTION

Typically, acoustic scenes are recorded by using a set of microphones. Each microphone outputs a microphone signal. For an audio scene of an orchestra, for example, 25 microphones can be used. Then, a sound engineer performs mixing of the 25 microphone output signals, for example into a standard format, such as a stereo format, a 5.1, 7.1, 7.2 or another corresponding format. In a stereo format, for example, the sound engineer or an automatic mixing process generates two stereo channels. In a 5.1 format, mixing results in five channels and one subwoofer channel. Analogously, in a 7.2 format, for example, a mixture into seven channels and two subwoofer channels is performed. When the audio scene is to be rendered in a reproduction environment, a mixing result is applied to electrodynamic loudspeaker. In a stereo reproduction scenario, two loudspeakers exist, wherein the first loudspeaker receives the first stereo channel and the second loudspeaker receives the second stereo channel. In a 7.2 reproduction format, for example, seven loudspeakers exist at predetermined positions and, above that, two subwoofers that can be placed in a relatively arbitrary manner. The seven channels are applied to the respective loudspeakers and the two subwoofer channels are applied to the respective subwoofers.

Using a single microphone arrangement for detecting audio signals and the usage of a single loudspeaker arrangement for reproducing the audio signals typically neglects the true nature of the loud sources. European patent EP 2692154 B1 describes a set for detecting and reproducing an audio scene where not only the translation is recorded and reproduced but also the rotation and above that the vibration. Thus, a sound scene is not only reproduced by a single detection signal or a single mixed signal but by two detection signals are two mixed signals that are, on the one hand, recorded simultaneously and that are, on the other hand, reproduced simultaneously. This achieves that different emission characteristics from the audio scene can be recorded compared to a standard recording and can be reproduced in a reproduction environment.

For this, as illustrated in the European patent, a set of microphones is placed between the acoustic scene and an (imaginary) auditorium to detect the "conventional" or translation signal that is characterized by high directivity or high Q.

Above that, a second set of microphones is placed above or on the side of the acoustic scene to record a signal with low Q or low directivity, which is to map the rotation of the soundwaves in contrast to the translation.

On the reproduction side, respective loudspeakers are placed at the typical standard positions, each of them having an omnidirectional arrangement to reproduce the rotational signal and a directional arrangement to reproduce the "conventional" translatory sound signal. Further, a subwoofer exists either at each of the standard positions or only a single subwoofer at any location.

European patent EP 2692144 B1 discloses a loudspeaker for reproducing, on the one hand, the translatory audio signal and, on the other hand, the rotatory audio signal. Thus, the loudspeaker has an omnidirectionally emitting arrangement on the one hand and a directionally emitting arrangement on the other hand.

European patent EP 2692151 B1 discloses an electret microphone that can be used for recording the omnidirectional or the directional signal.

European patent EP 3061262 B1 discloses an earphone and a method for producing an earphone generating both a translatory sound field as well as a rotatory sound field.

European patent application EP 3061266 A0 intended for grant discloses a headphone and a method for generating a headphone that is configured to generate the "conventional" translatory sound signal by using a first transducer, and to generate the rotatory sound field by using a second transducer arranged perpendicular to the first transducer.

Recording and reproducing the rotatory sound field in addition to the translatory sound field results in a significantly improved and therefore high-quality audio signal perception that almost gives the impression of a live concert although the audio signal is reproduced by loudspeakers, headphones or earphones.

This results in a sound experience that is almost indistinguishable from the original sound scene where the sound is not emitted by loudspeakers, but by musical instruments or human voices. This is obtained by considering that sound is emitted not only in a translatory but also rotatory and possibly vibratory manner and is hence to be recorded and reproduced accordingly.

It is the object of the present invention to provide an improved concept for recording the entire sound on the one hand and for reproducing this entire recorded sound on the other hand.

SUMMARY

According to an embodiment, a microphone may have: a first partial microphone with a first diaphragm pair having a first diaphragm and a second diaphragm that are arranged opposite each other; and a second partial microphone with a second diaphragm pair having a third diaphragm and a fourth diaphragm that are arranged opposite each other, wherein the first diaphragm pair is arranged such that the first diaphragm and the second diaphragm are deflectable along a first spatial axis, wherein the second diaphragm pair is arranged such that the third diaphragm and the fourth diaphragm are deflectable along a second spatial axis and wherein the second spatial axis differs from the first spatial axis.

According to another embodiment, a reproduction apparatus for an acoustic signal may have: an interface for receiving a first electric signal corresponding to an acoustic common mode signal, a separate second electric signal corresponding to a first acoustic differential signal and a separate third electric signal corresponding to a second acoustic differential signal; first loudspeaker means for reproducing the first electric signal as acoustic common mode signal; and second loudspeaker means for reproducing the second electric signal and the third electric signal as acoustic differential signals, wherein the second loudspeaker means differs from the first loudspeaker means.

According to another embodiment, a mobile device may have: an interface for receiving at least a first electric signal corresponding to an acoustic common mode signal, at least a separate second electric signal corresponding to a first acoustic differential signal and at least a separate third electric signal corresponding to a second acoustic differential signal; wherein the at least first electric signal is a microphone signal recorded by a microphone arrangement or a synthesized microphone signal, wherein the at least second electric signal is a first differential output signal and the at least third electric signal is a second differential output signal, a renderer configured to generate the microphone signal by using a virtual position of the real or virtual microphone and by using information on the different loudspeaker positions, to generate a loudspeaker signal for each of a first plurality of loudspeakers, or to render several microphone signals by using virtual positions of the real or virtual microphones and by using different head-related transfer functions that depend on the positions and a respective side of a headphone, to generate a headphone signal for each side of two headphone sides, and to render the first differential output signal and the second differential output signal by using the position of the real or virtual microphone and by using the different loudspeaker positions, to generate a loudspeaker signal for each loudspeaker of a plurality of second loudspeakers, or to render respective first differential output signals and respective second differential output signals by using the virtual positions of the real or virtual microphones and by using different head-related transfer functions that depend on the positions and a respective side of a headphone, to generate a headphone signal for each side of two headphone sides; and output means for outputting generated signals to the loudspeakers or headphone sides.

According to still another embodiment, a method for recording an acoustic signal may have the steps of: operating a first partial microphone with a first diaphragm pair having a first diaphragm and a second diaphragm that are arranged opposite each other; and operating a second partial microphone with a second diaphragm pair having a third diaphragm and a fourth diaphragm that are arranged opposite each other, wherein the first diaphragm pair is arranged such that the first diaphragm and the second diaphragm are deflectable along a first spatial axis, wherein the second diaphragm pair is arranged such that the third diaphragm and the fourth diaphragm are deflectable along a second spatial axis and wherein the second spatial axis differs from the first spatial axis.

According to another embodiment, a method for reproducing for an acoustic signal may have the steps of: receiving a first electric signal corresponding to an acoustic common mode signal, a separate second electric signal corresponding to a first acoustic differential signal and a separate third electric signal corresponding to a second acoustic differential signal; reproducing the first electric signal as acoustic common mode signal with first loudspeaker means; and reproducing the second electric signal and the third electric signal as acoustic differential signals with second loudspeaker means, wherein the second loudspeaker means differs from the first loudspeaker means.

Another embodiment may have a non-transitory digital storage medium having stored therein a computer program for performing a method for recording an acoustic signal, having the steps of: operating a first partial microphone with a first diaphragm pair having a first diaphragm and a second diaphragm that are arranged opposite each other; and operating a second partial microphone with a second diaphragm pair having a third diaphragm and a fourth diaphragm that are arranged opposite each other, wherein the first diaphragm pair is arranged such that the first diaphragm and the second diaphragm are deflectable along a first spatial axis, wherein the second diaphragm pair is arranged such that the third diaphragm and the fourth diaphragm are deflectable along a second spatial axis and wherein the second spatial axis differs from the first spatial axis, when the computer program is run by a computer or processor.

Another embodiment may have a non-transitory digital storage medium having stored therein a computer program for performing a method for reproducing for an acoustic signal, having the steps of: receiving a first electric signal corresponding to an acoustic common mode signal, a separate second electric signal corresponding to a first acoustic differential signal and a separate third electric signal corresponding to a second acoustic differential signal; reproducing the first electric signal as acoustic common mode signal with first loudspeaker means; and reproducing the second electric signal and the third electric signal as acoustic differential signals with second loudspeaker means, wherein the second loudspeaker means differs from the first loudspeaker means, when the computer program is run by a computer or processor.

According to the invention, not only a single rotational signal is recorded as in the known technology, but measures are taken to detect and reproduce the direction of the rotational signal. According to the invention, it has been found that the rotation of the sound field or the rotation of the molecules existing in air, which takes place in addition to the translation, has a directional component, by the detection and reproduction of which an additional sound experience can be obtained, which is even closer to the original natural sound scenario.

For that purpose, a microphone includes a first partial microphone with a first diaphragm pair with diaphragms arranged opposite each other and a second partial microphone with a second diaphragm pair also comprising diaphragms arranged opposite each other. The first diaphragm pair is oriented such that the diaphragms of the first diaphragm pair are deflectable along a first spatial axis and the second diaphragm pair is arranged such that the diaphragms of the second diaphragm pair is deflectable along a second spatial axis that differs from the first spatial axis. Advantageously, additionally, a third partial microphone having a third diaphragm pair is provided, wherein the diaphragms of the third diaphragm pair are deflectable along a third spatial axis that differs from the first and second spatial axis, wherein the spatial axes are advantageously orthogonal or essentially orthogonal to each other.

In advantageous embodiments, an individual differential output signal is derived from each diaphragm pair of the microphone by combining the diaphragm output signals of the two diaphragms arranged opposite each other, by using a change of the phase relation and advantageously a phase inversion of one of the two diaphragm output signals. Thereby, an individual differential signal is generated for each spatial axis, which reproduces a respective directional component of the rotational signal or generally a differential signal in each spatial axis.

Such a microphone having two or three partial microphones can advantageous also be used to generate not only the novel differential signals, but also typical component signals, as they are known, for example, in the field of ambisonics technology. For this, the diaphragm output signals of the two opposite diaphragms can be added up to obtain a respective ambisonics component. Above that, it is of advantage that the microphone additionally detects an omnidirectional component that is obtained either by an individual omnidirectional microphone or by adding up the three directional components.

Thereby, a microphone according to an advantageous embodiment of the present invention does not only generate the three novel differential signals in x-direction, y-direction, and z-direction, but also the four components B (or W) X, Y and Z of a known first order ambisonics signal or a B-format signal.

Thereby, according to the invention, further improvement of the acoustic quality when reproducing such signals is obtained.

On the reproduction side, it is of advantage to reproduce, in addition to the conventional or common mode signal, at least two and advantageously all three differential signals or differential mode signals by means of a loudspeaker system comprising one or several loudspeakers for reproducing the conventional CM signal, and further comprising a second or a second and a third loudspeaker to reproduce the differential signal. In particularly advantageous embodiments, three differential signals are provided and the second loudspeaker means for reproducing the three differential signals all in all includes at least six transducers that are arranged in three different spatial directions, such that the differential signals recorded in different spatial directions are reproducing the same direction on the reproduction side where they have been originally recorded.

Depending on the implementation, several simplifications can be made to establish a trade-off between efforts on the one hand and achieved audio quality on the other hand.

In advantageous embodiments, rendering a microphone signal in a reproduction environment is provided where loudspeakers are placed at specific known positions. For this, on the one hand, a conventional translatory microphone signal is used, which can consist of an omnidirectional component and parametric side information, or which exists as full B-format signal. For rendering the microphone signal on the individual loudspeakers, advantageously, vector-based amplitude panning (VBAP) is performed, for which respective weighting factors from the directional information included in the side information or derived from the B-format signal are used.

Advantageously, these weighting factors are also used not only to render the conventional translatory audio signal or to "to distribute" the same to the individual loudspeakers. Instead, these weighting factors are also used to weight or "distribute" the novel differential signals in the different spatial axes to the different loudspeakers. Thus, from a complete microphone signal generated at a specific recording position that consists of a conventional omnidirectional component and three directional components and/or (parametric) metadata comprising directional information and that additionally comprises the novel two or three differential signals of the two or three spatial axes, a complete reproduction can be generated. A loudspeaker at one of the loudspeaker positions includes a conventional translatory element that is supplied with the rendered translatory audio signal for this loudspeaker at this loudspeaker position and additionally, for each of the differential signals, a different signal transducer arranged according to the spatial direction of the differential signal that can be configured, for example, as double diaphragm without housing who's emission direction is arranged in the respective spatial axis or spatial direction.

BRIEF DESCRIPTION OF THE DRAWINGS

Embodiments of the present invention will be discussed below in more detail with reference to the accompanying drawings, in which.

DETAILED DESCRIPTION OF THE INVENTION

Figure 1:
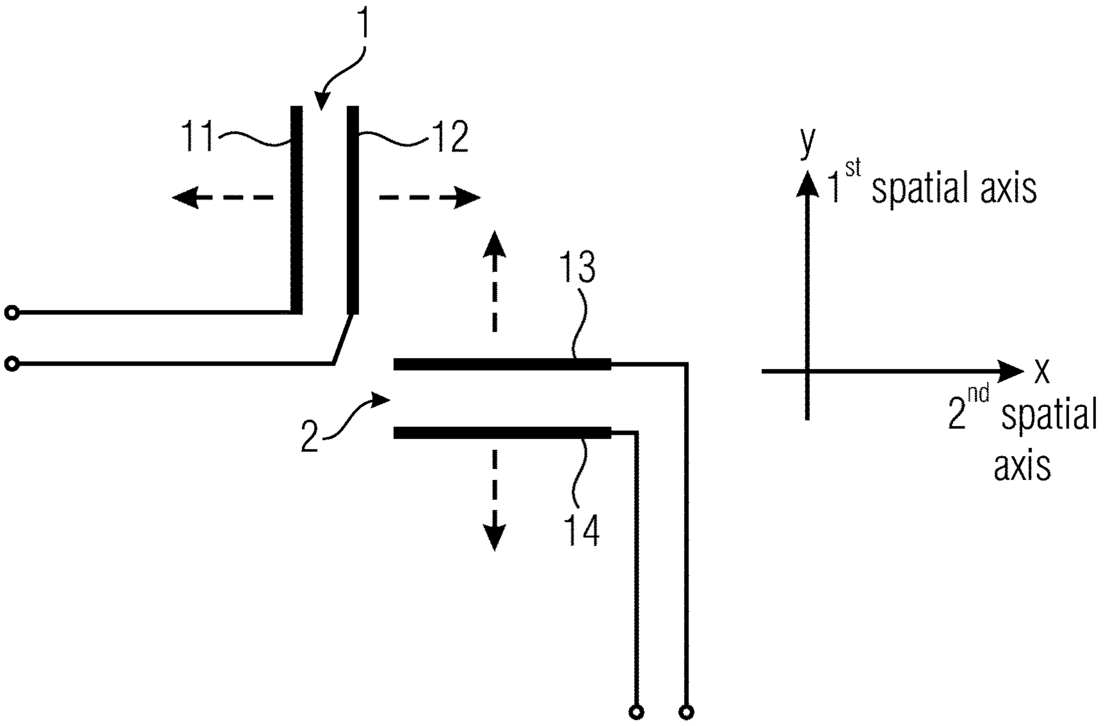
FIG. 1 shows a microphone having two partial microphones.

FIG. 1 shows a first partial microphone 1 with a diaphragm pair comprising a first diaphragm 11 and a second diaphragm 12 that are arranged opposite each other. Above that, FIG. 1 shows a second partial microphone 2 with a second diaphragm pair comprising a third diaphragm 13 and a fourth diaphragm that are arranged opposite each other. The first diaphragm pair is arranged such that the first diaphragm 11 and the second diaphragm are deflectable along a first spatial axis, such as the x-axis wherein further the second diaphragm pair is arranged such that the third diaphragm 13 and the fourth diaphragm 14 are deflectable along a second spatial axis, such as the y-axis of FIG. 1. The spatial axis differs from the first spatial axis, i.e., the two spatial axis are not parallel. Advantageously, the two spatial axis x, y are orthogonal to one another or have an angle that is between 60 and 120°.

Figure 2:
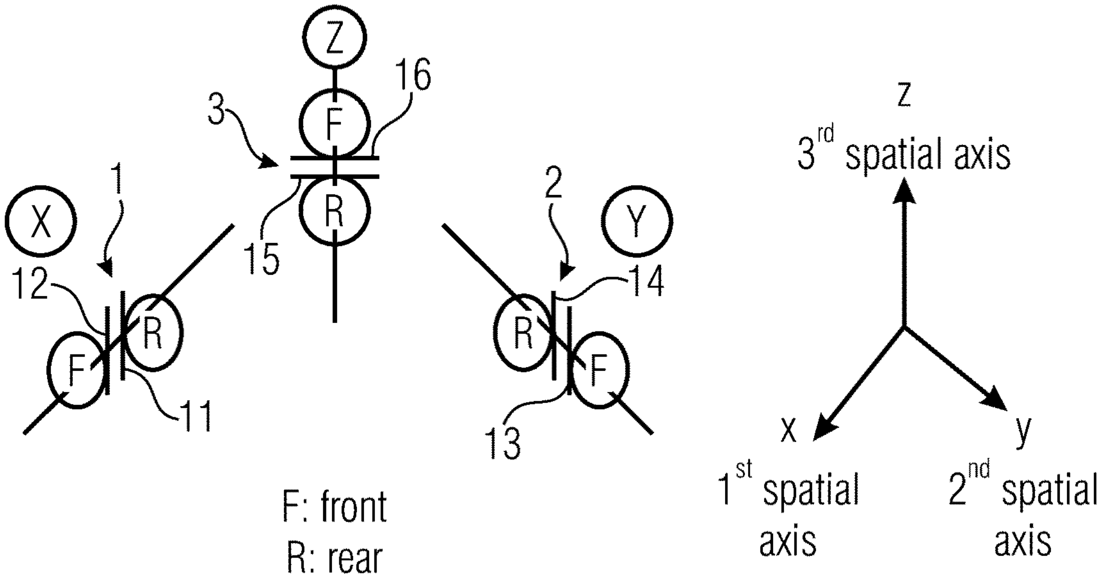
FIG. 2 shows a microphone having three partial microphones.

Further, FIG. 2 shows a third partial microphone 13 with a third diaphragm pair comprising a fifth diaphragm 15 and a sixth diaphragm 16 that are arranged opposite each other, wherein the third diaphragm pair is arranged such that the fifth diaphragm 15 and the sixth diaphragm 16 are deflectable along a third spatial axis, such as the z-axis. The third spatial axis differs from the first spatial axis and the second spatial axis, wherein advantageously all three spatial axis are orthogonal to one another. Different angles between the third spatial axis and the first or second spatial axis, such as in a range between 60 and 120° are advantageous.

Further, FIG. 2 shows for each diaphragm 11 to 16 a very schematic sensitivity characteristic that traditionally either has the letter F or the letter R. F stands for front and R stands for rear. The difference in sensitivity characteristics of the individual diaphragms each of which typically having a counterelectrode are also arranged opposite each another.

As shown further for example in FIG. 1 or FIG. 2 it is of advantage that the diaphragms of the different diaphragm pairs are directly opposite, parallel to one another and aligned to one another, wherein further a distance between the two diaphragm pairs is small and advantageously less than 2 cm. Further, it is of advantage that the distance for each diaphragm pair is essentially the same within a tolerance. Further, FIG. 1 shows output lines for each diaphragm. In particular, the first partial microphone 1 is configured such that in response to a deflection of the first diaphragm 11, a first diaphragm signal is provided and that in response to a deflection of the second diaphragm, a second diaphragm signal is provided, which has a specific phase relation to the first diaphragm signal that results due to the arrangement of the diaphragms or the wiring or the indicated sound or the recorded sound field.

Above that, the second partial microphone 2, which includes the two diaphragms 13, 14, also comprises output lines to provide a third diaphragm signal from the third diaphragm 13 and a fourth diaphragm signal from the fourth diaphragm 14. Further, depending on the implementation, the third partial microphone is also configured to provide a fifth diaphragm signal in response to a deflection of the fifth diaphragm and to provide a sixth diaphragm signal in response to a deflection of the diaphragm 16 in the third spatial axis, i.e., for example in the z direction.

The first partial microphone, the second partial microphone and, if present, the third partial microphone are configured to combine the respective diaphragm signals of the diaphragms of the diaphragm pair. This is illustrated schematically in FIG. 3 by a schematic combiner that is shown at 30 as one block for all two or three partial microphones. However, a respective individual combiner as shown, for example, in FIG. 3*b* at 31 can exist for each individual partial microphone, such that the diaphragm signals of always one partial microphone are combined, however, such that diaphragm signals of different partial microphones are not combined at least for generating a first differential output signal 21 for the first partial microphone, a second differential output signal 22 for the second partial microphone and a third differential output signal 23 for the third partial microphone. However, in advantageous embodiments, the combiner 30 is configured to form not only the differential signals 21, 22, 23 but also common mode or CM signals 24. These CM signals 24 can be, for example, merely individual component signals X, Y, Z as known from ambisonics technology, or an omnidirectional signal that is obtained, for example, when the diaphragm signals of all individual diaphragms are added up without phase shift of individual diaphragm signals.

For generating a differential signal as, for example, the differential output signal Diffx 21, the combiner 30 is configured to combine the first diaphragm signal 11 and the second diaphragm signal 12 with a modified first phase relation. Thus, the first differential output signal Diffx 21 is allocated to the first spatial axis, for example the x-axis.

Figure 3A:
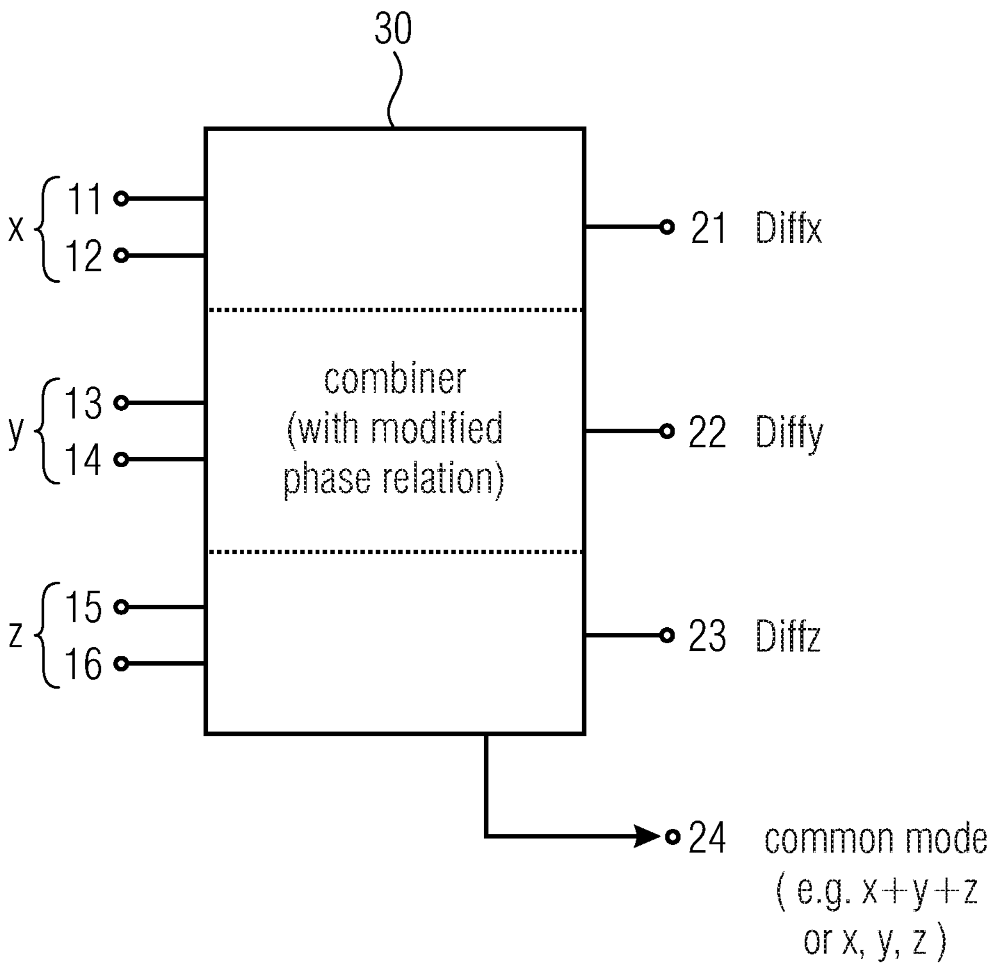
FIG. 3*a* shows a combiner for generating the differential signals.

Further, the second partial microphone is configured to combine the second diaphragm signal 13 and the third diaphragm signal 14 with a modified second phase relation to provide a second differential output signal Diffy shown at 22 in FIG. 3*a* and allocated to the second spatial axis y. Further, the third partial microphone is configured to combine the fifth diaphragm signal 15 and the sixth diaphragm signal 16 with a phase relation modified with respect to the third phase relation to provide a third differential output signal that is shown at 23 in FIG. 3*a* and allocated to the spatial axis z.

Figure 3B:
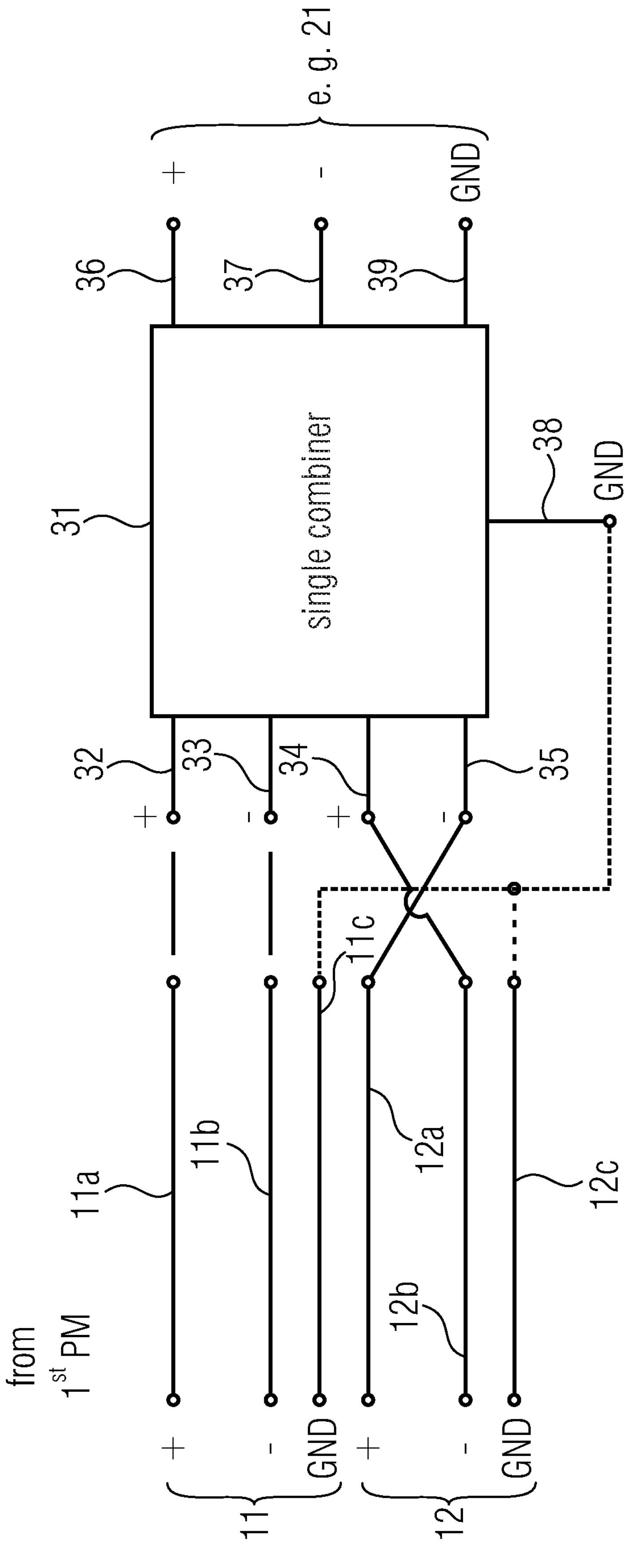
FIG. 3*b* shows an individual combiner for differential signal routing.
Figure 3C:
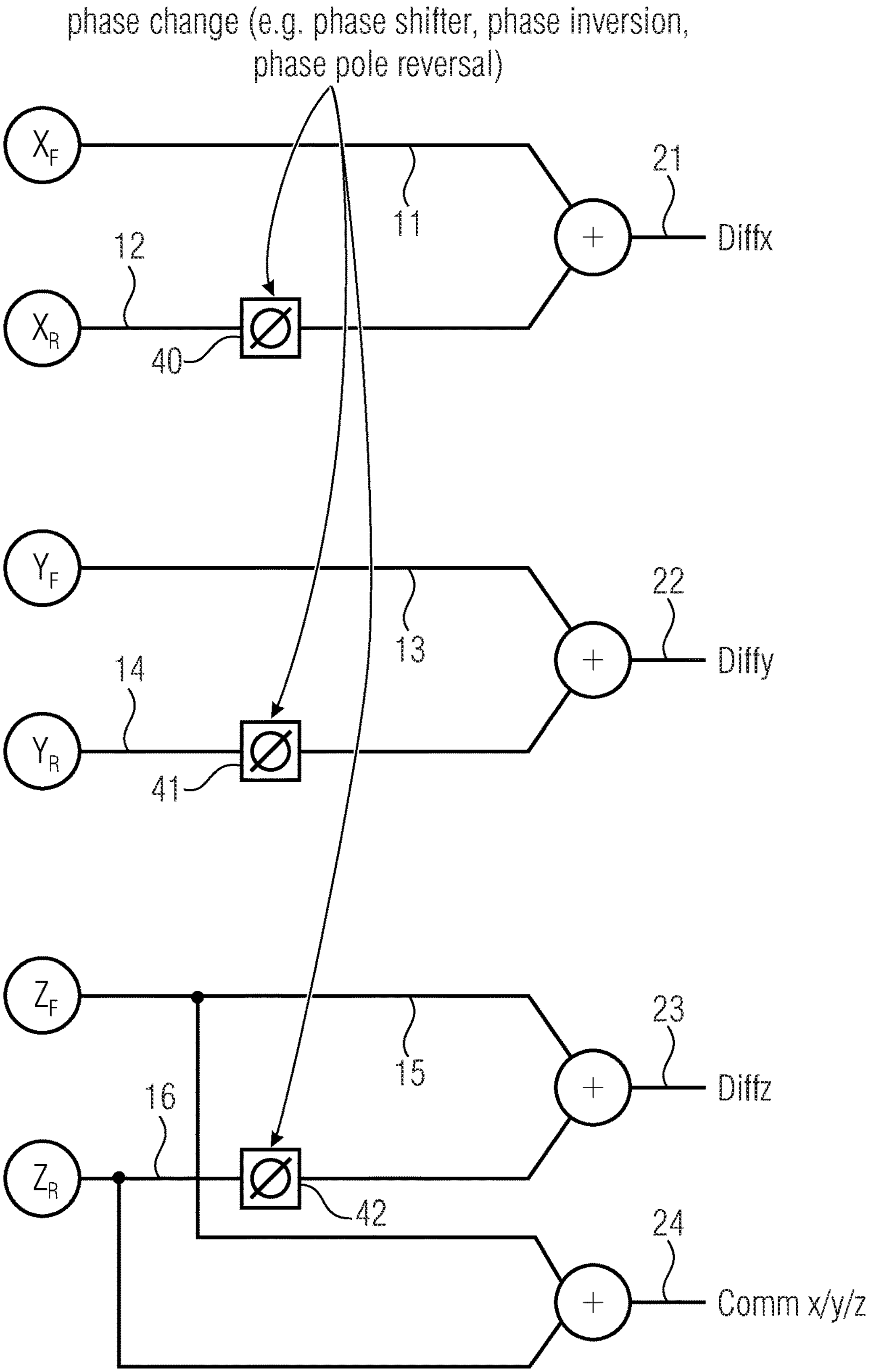
FIG. 3*c* shows a combiner according to an embodiment.

Advantageously, the combination is performed such as it is schematically illustrated in FIG. 3*c*. For modifying the first phase relation between the first diaphragm signal 11 and the second diaphragm signal 12 FIG. 3*c* shows schematically a phase changing member 14 advantageously having a phase value of 180°, wherein the phase angle of the phase member can be in the range between 90° and 270°. However, in the most advantageous embodiment, the range is advantageously 170° to 190° or 180°.

The phase changing means 41 is provided to change the second phase relation for the second partial microphone such that an addition as schematically show in FIG. 3*c* takes place with modified second phase relation.

Above that, also for the third partial microphone, a phase changing element 42 is provided that changes the third phase relation between the diaphragm signals 15, 16 and adds the signals with modified third phase relation to obtain the third differential output signal Diffz 23 of FIG. 3*c*.

As illustrated already based on reference number 24 in FIG. 3*a*, the combiner is also configured to form conventional common mode signals. To form a CM-z signal, the fifth diaphragm signal 15 and the sixth diaphragm signal 16 are added with the original third phase relation, i.e., for example without the effect of a phase member 42.

The same is performed to obtain a conventional y-directional component of a directional microphone by adding the diaphragm signals of the second diaphragm pair 13, 14 with the original phase relation, i.e., without the effect of a phase member 41. Analogously, an X component of a directional microphone is obtained when the two directional characteristics, i.e., for the front diaphragm 11 and the rear diaphragm 12 are added, again without effect of a phase element 40.

An entire omnidirectional signal can be obtained when all six diaphragm signals are added in their original first second and third phase relation, wherein this omnidirectional signal, for example, is referred to as W signal or P signal as it is also known from ambisonics technology or for a signal in B-format which comprises an omnidirectional component and directional component in X-direction, a directional component in Y-direction and a Z-component in the Z-direction.

In contrary to such a B-format signal, the inventive microphone provides, in addition to these signals or as an alternative to these signals, differential signals for the individual directions, i.e., signals that result when a difference between the front and the rear directional characteristic is formed to detect the sound field which actually prevails on the side with respect to diaphragms that are arranged opposite each other, i.e., above and below the two diaphragms 11, 12 of FIG. 1.

The change between the first phase relation on the left in FIG. 3*c* and the second phase relation on the right in FIG. 3*c* from the respective addition can be obtained by an actually provided phase shifter, a delay line, a phase inversion or also a phase pole reversal. The latter case of phase pole reversal is used for an advantageous embodiment where the diaphragm signals are transmitted as symmetrical signals between a plus line 11*a* and minus line 11*b*. Such a schematic illustration of the diaphragm signal 11 is shown in FIG. 3*b*, wherein the "line" 11 in FIG. 3*c* corresponds to the positive individual line 11*a*, the negative individual line 11*b* and ground (GND) 11*c*. The same applies for the second diaphragm signal 12, which consists again of a positive line 12*a*, negative line 12*b* and a common ground 12*c*. The actual diaphragm signal is transmitted as difference between the positive and negative line as it is known for symmetrical line transmission.

For combining such a signal, the combiner 30 is configured as illustrated in FIG. 3*b* for an individual combiner 31. The individual combiner 31 would be provided for each of the three partial microphones 1, 2 of FIG. 1 in its respective implementation. The individual combiner 31 has two inputs 32, 34 for the positive potential and two inputs 33, 35 for the negative potential as well as one (or two) ground inputs for the ground potential GND. In order to obtain the phase inversion as illustrated in FIG. 3*c* by the element 40 or 41 or 42, in the embodiment shown in FIG. 3*b* with symmetrical signal transmission, the polarity of the positive and negative line is reversed, as shown on the left in FIG. 3*b* for the diaphragm signal 12. The positive line 12*b* is connected to negative input 35 and the negative line 12*b* is connected to the positive input 34. At the output, the individual combiner provides the differential signal 21 indicated by Diffx, which is again transmitted as a differential signal between the positive line 36 and the negative line 37, wherein an output ground 39 (GND) is also provided.

Although such an individual combiner is illustrated in FIG. 3*b* merely for the first partial microphone it is of advantage to use such an individual combiner also for the second partial microphone and for the third partial microphone.

Figure 4:
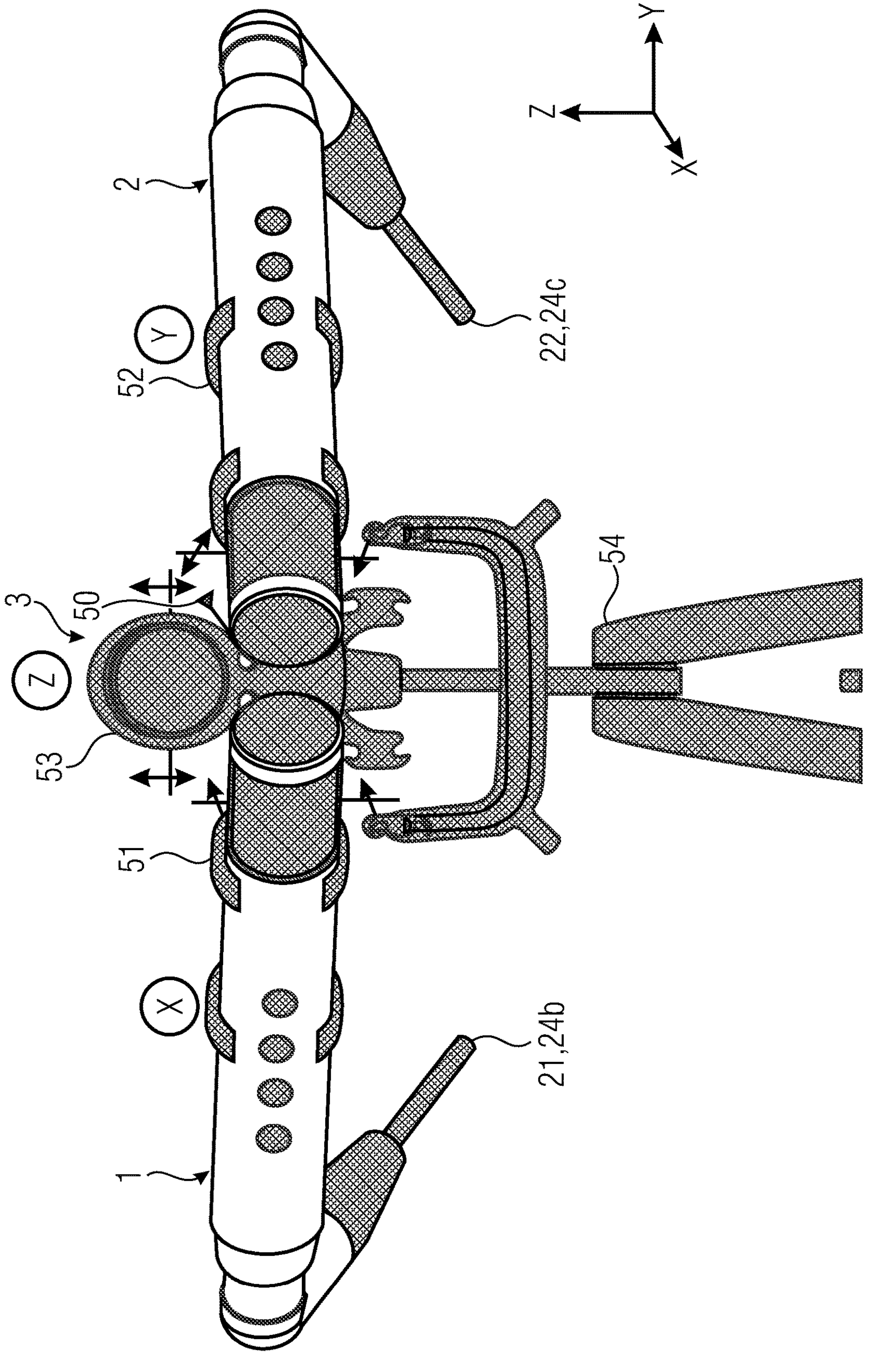
FIG. 4 shows a microphone according to embodiment.
Figure 7:
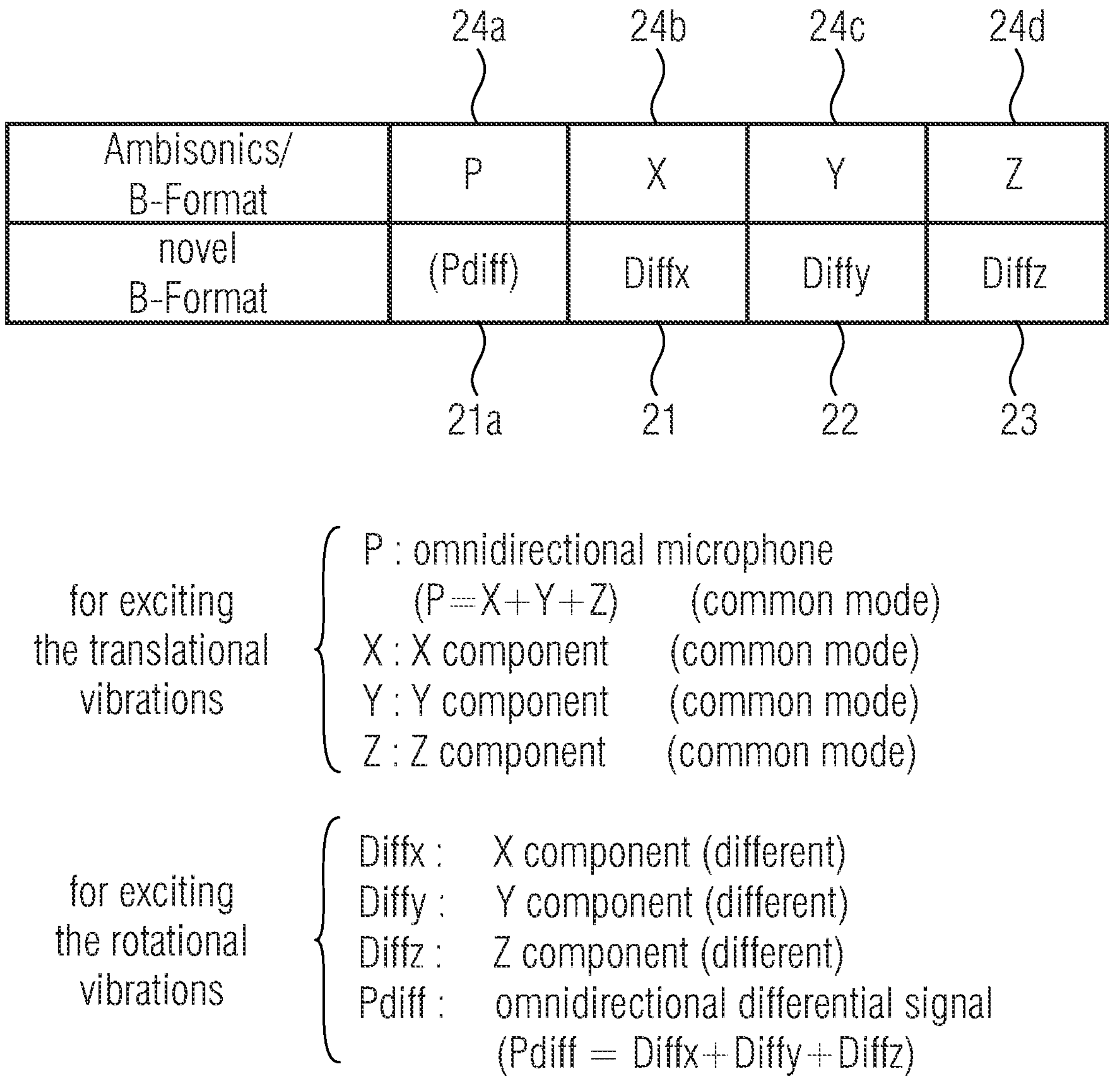
FIG. 7 shows an overview of conventional and novel real or virtual microphone signals.

FIG. 4 shows an advantageous embodiment of the microphone wherein the three partial microphones are all held by a diaphragm holder 50, wherein each partial microphone comprises a longitudinal housing, wherein the diaphragm pairs are arranged in the respective tip of the partial microphone, advantageously protected from the outside by a permeable grid. In particular, the two diaphragms of the first partial microphone 1 are arranged in the y-z plane, such that a deflection in the x-direction is obtained. Above that, the two diaphragms of the second partial microphone 2 are arranged in the x-z plane to obtain deflection in the y-direction, i.e. in the second spatial axis. Above that, the two diaphragms of the third partial microphone 3 are arranged in the x-y plane to be deflected by sound in the Z-direction. Further, the individual partial microphones have an output line that either routes the individual diaphragm signals to the outside or that already route the differential output signal 21, 22 or 23 (not shown in FIG. 4) to the outside. Depending on what electronics is already incorporated in the longitudinal housing of the respective partial microphone, the individual lines can also route the conventional common mode components in the individual direction to the outside, as shown at 24*b*, 24*c* for x and y, wherein the signal Z, which will be discussed based on FIG. 7, is not illustrated in FIG. 4 but can already be generated by the third partial microphone 3, advantageously within the longitudinal housing.

Figure 5:
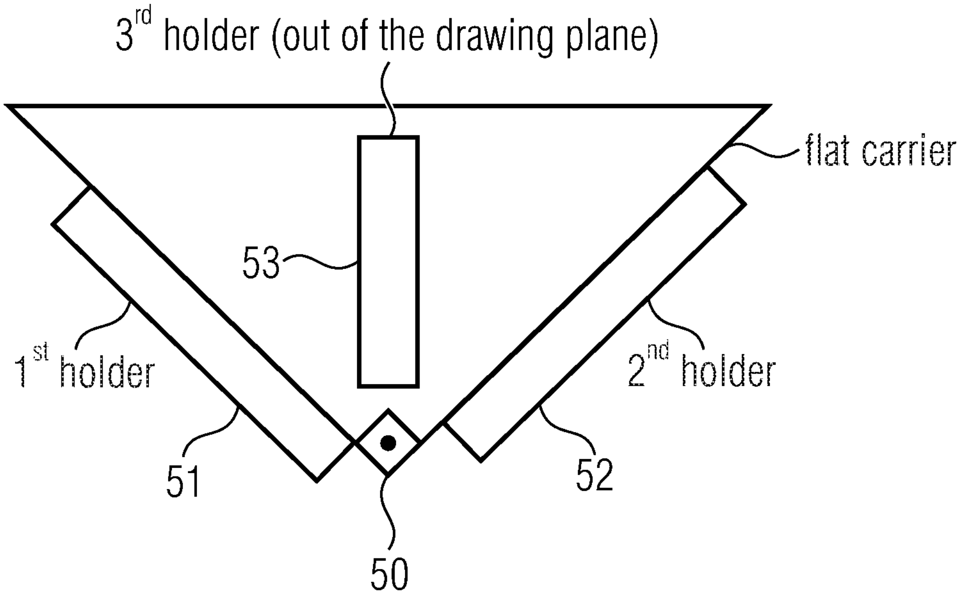
FIG. 5 shows a microphone holder according to an embodiment.

The three partial microphones are configured such that each diaphragm comprises a counterelectrode, such that six individual diaphragms and six respective counterelectrodes exist overall in the inventive microphone shown in FIG. 4. These counterelectrodes form an individual capacitor microphone for each diaphragm, wherein, depending on the implementation, a capacitor or electret foil can be deposited on the respective counterelectrode to have six individual capacitor or electret microphones in the arrangement shown in FIG. 4. The "tips" of the three partial microphones 1, 2, 3 are directed to a common area or a common axis to position the three diaphragm pairs as close as possible to one another to be able to detect a rotational vibration illustrated by their three individual components, which indicate the direction of rotation. To obtain this, advantageously, a schematic (partial) microphone holder shown in FIG. 5 is provided, which is shown at 50 in FIG. 4, and which is shown schematically in top view in FIG. 5. The microphone holder has a triangular shape but can also have a kite shape or can also have a different shape. The same includes two sides having an angle of 90° to one other to align the partial microphone 1 and the partial microphone 2 at an angle of 90° to one another. For this, a first holder 51 is provided, which is provided on the first side of the two rectangular sides, and a second holder 52, which is provided at the other side of the two rectangular sides. A third holder 53 is provided to hold the third microphone, which is configured in the bisecting line of the 90° angle of the two sides where the first holder 51 and the second holder 52 are provided and projects from the drawing plane to bring the third partial microphone as close as possible, with respect to its sensitive microphone tip to the two microphone tips of the first and second partial microphone. The holders 51, 52 and 53 are advantageously configured as clips to be able to mount the individual partial microphones without any tools. Other holding means can also be provided to hold the longitudinal partial microphones in the respective angular form, such that the diaphragm pairs are aligned as illustrated based on FIG. 1 or FIG. 2.

For other arrangements where the exact rectangular arrangement between the individual microphones is not important, the microphones can also be arranged at an angle between 70° and 110° or the third holder 53 or the third partial microphone can be arranged at an angle between 30° and 60° with respect to the first holder or the second holder.

The microphone holder 50 is further mounted to a tripod 54 shown schematically in FIG. 4. Instead of the tripod 54, the microphone can also be suspended from a ceiling with a rope structure in order to have the bottom area free, for example, when a stage is to be recorded.

Instead of the elastic clips illustrated in FIG. 4 for the individual holders, magnetic holders, latching elements or other holders can be used.

FIG. 7 shows an overview of all signals that can be provided by the microphone as illustrated based on FIG. 4 or FIG. 2 or FIG. 3*b*. First, the microphone can provide the components of the B-format that is also referred to as FOA (First Order Ambisonics)-format. This is an omnidirectional signal 24*a* and the directional components 24*b*, 24*c*, 24*d* as illustrated in FIG. 3*c* at the output 24. These signals are commonly used for exciting the conventional translation vibrations across a respectively arranged sound transducer.

For generating the rotational vibration, which significantly improves the audio quality, also in a sound field, the inventive microphone provides the differential signals in three spatial directions Diffx 21, Diffy 22 and Diffz 23. Analogously to the omnidirectional signal 24*a*, an omnidirectional differential signal 21*a* could also be generated, which can be obtained by adding the three directional differential signals.

Thereby, the present invention provides a novel B-format for the rotational vibrations or the differential sound field.

Figure 6:
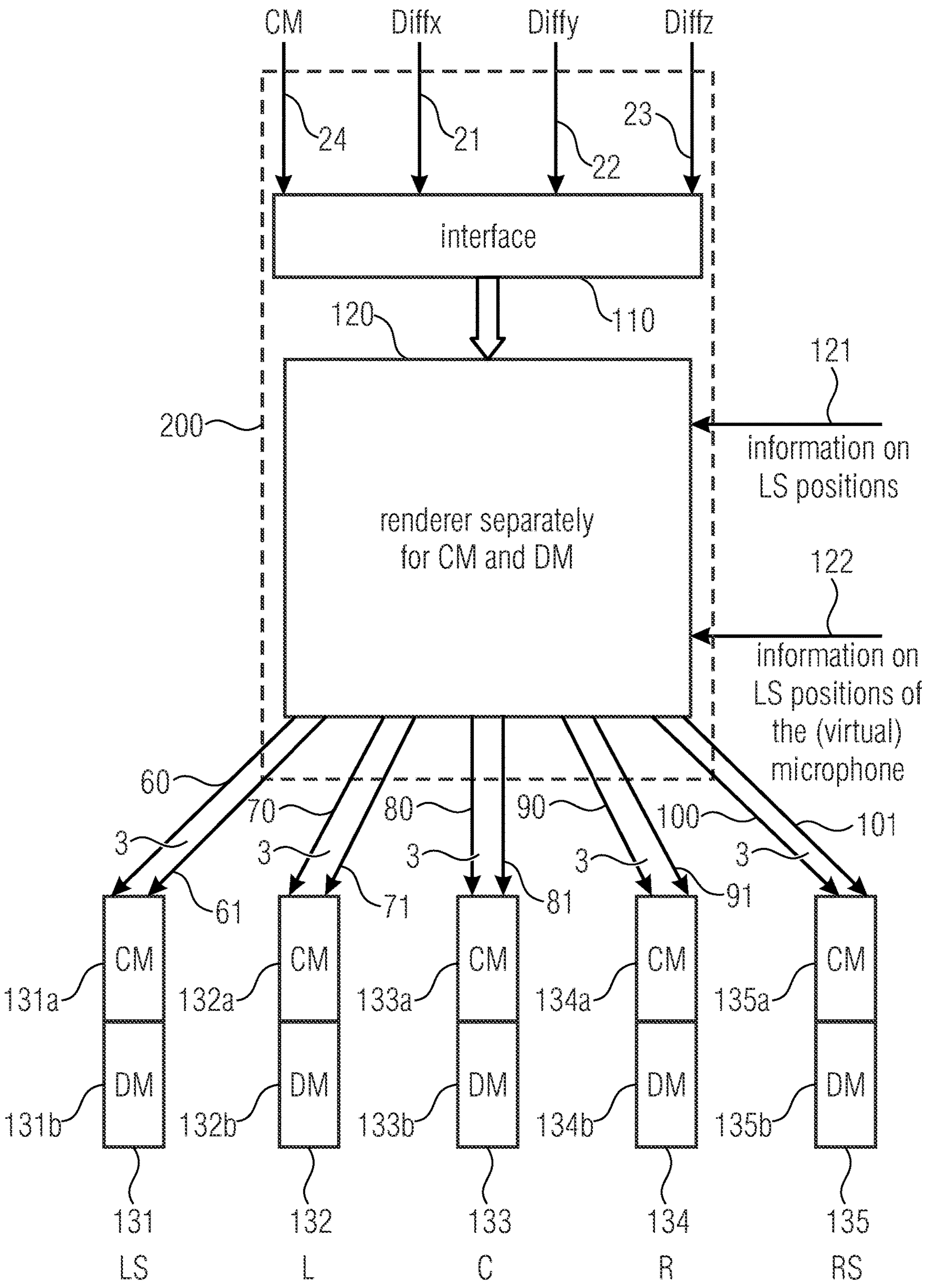
FIG. 6 shows a reproduction apparatus according to an embodiment.

FIG. 6 shows a reproduction apparatus for an acoustic signal illustrated by the input signals Diffx 21, Diffy 22 and Diffz 23 as well as by one or several common mode signals (CM) 24. The reproduction apparatus includes an interface

110 for receiving the first electric signal 24 corresponding to an acoustic common mode signal, a separate second electric signal corresponding to an acoustic differential signal and a separate third electric signal corresponding to an acoustic differential signal.

Above that, the reproduction apparatus includes first loudspeaker means 131*a*, 132*a*, 133*a*, 134*a*, 135*a*, for reproducing the first electric signal, wherein the first loudspeaker means is configured to generate translational vibrations in response to the first electric signal. Further, the reproduction apparatus includes second loudspeaker means 131*b*, 132*b*, 133*b*, 134*b*, 135*b* for reproducing the second and third electric signals, wherein the second loudspeaker means differs from the first loudspeaker means.

Particularly, the second loudspeaker means is configured to generate rotational vibrations in response to the second signal, i.e., to a first differential signal and to the third electric signal, i.e., in response to the second differential signal. In other words, the second loudspeaker means is configured to generate sound with a second directional characteristic that differs from a first directional characteristic that is allocated to the first loudspeaker means.

In the embodiment illustrated in FIG. 6, the reproduction apparatus further comprises a renderer 120 that operates separately for the common mode signals, i.e., for the first electric signal 24 and the differential signals (DM-differential mode) and that obtains, in one embodiment, information on a loudspeaker position in an auditorium as illustrated in 121 and information 122 on a position of the microphone, for example the microphone illustrated in FIG. 4. The microphone does not necessarily have to be a real microphone, but can also be a virtual microphone processing synthetic or previously recorded signals and brings them into a specific microphone format, wherein this microphone format relates to the state of the sound field at a recording position where the virtual microphone is arranged. To describe a sound field, several virtual microphone signals can be used and be processed in the renderer 120.

The renderer 120 operates separately for the common mode signals and the differential signals. In the example shown in FIG. 6, the common mode signals are provided as signals 60, 70, 80, 90, 100 for a system having five reproduction positions, a left surround reproduction position or reproduction position arranged on the rear left LS, a left reproduction position L, a center reproduction position C, a right reproduction position R and a right surround reproduction position or reproduction position arranged on the rear right RS. Parallel thereto, the renderer 120 also provides differential signals to the respective loudspeakers indicated by 61, 71, 81, 91, 101. In an advantageous embodiment, the renderer provides, for each individual loudspeaker consisting both of the loudspeaker unit 131*a* and the second loudspeaker means 131*b* not only a single differential signal, but three differential signals, namely for the spatial directions x, y, z. Depending on the implementation, two or only a single differential signal can be provided, such that merely two or only a single differential signal are provided to the responsive loudspeaker and in particular the respective loudspeaker means for the differential signals 131*b*, 132*b*, 133*b*, 134*b*, 135*b* on the lines 61, 71, 81, 91, 101.

Although rendering of loudspeaker signals has been described above, the invention can also be used for rendering headphone signals from many different microphone signals at many different positions. For each "path" from a microphone position to one side of the headphone, i.e., to left or right, a head-related transfer function exists. The respective signal is provided with the same, to add then the respectively provided signals for each side to obtain the final headphone signal for the respective side.

Thus, the renderer 120 is configured to render 120 the microphone signal by using a virtual position 122 of the real or virtual microphone and by using information 121 on the different loudspeaker positions to generate a loudspeaker signal 60, 70, 80, 90, 100 for each of a first plurality of loudspeakers, or to render 120 several microphone signals by using virtual positions of the real or virtual microphones and by using different head-related transfer functions (HRTF) that depend on the positions and the respective side of a headphone to generate a headphone signal 60, 70, 80, 90, 100 for each side of two headphone sides to render 120 the first differential output signal 21 and the second differential output signal 22 by using the position of the real or virtual microphone and by using the different loudspeaker positions, to generate a loudspeaker signal 61, 71, 81, 91, 101 for each loudspeaker of a plurality of second loudspeakers, or to render 120 respective first differential output signals and respective second differential output signals by using the virtual positions of the real or virtual microphones and by using different head-related transfer functions (HRTF) that depend on the positions and the respective side of a headphone, and the same includes output means for outputting generated signals to the loudspeakers or the headphone sides.

Figure 9A:
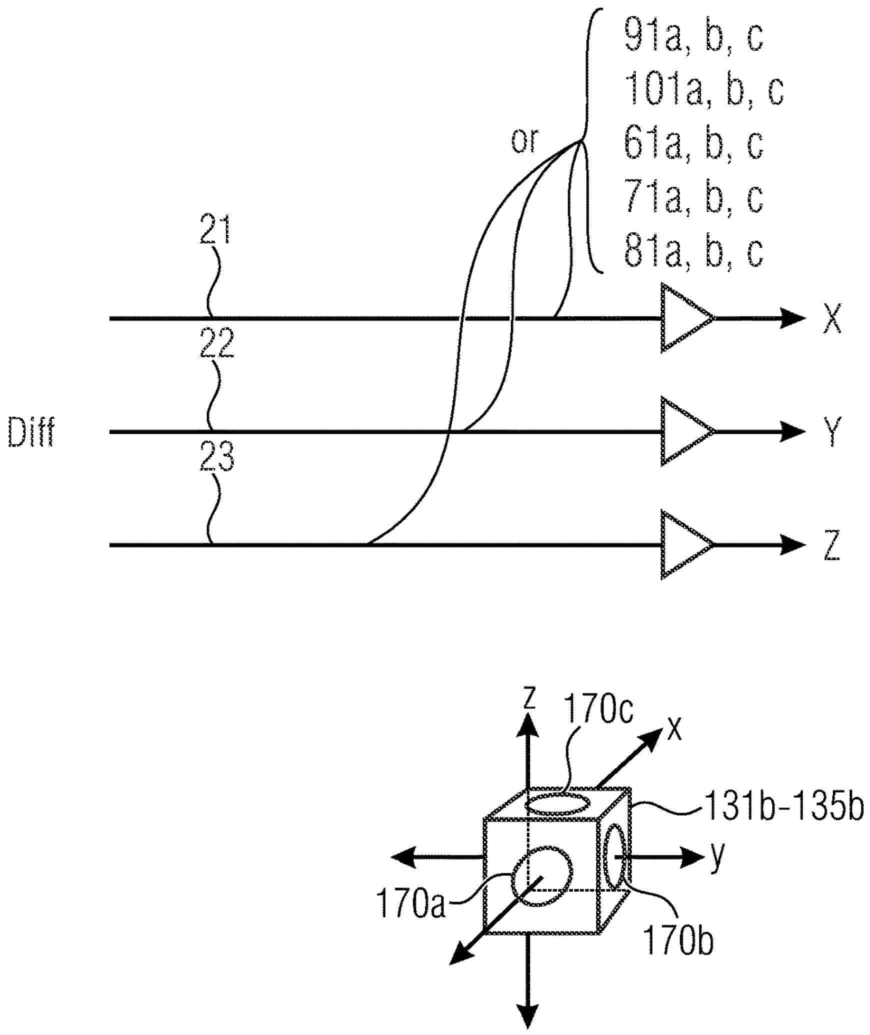
FIG. 9*a* shows a transducer arrangement having transducers for each of the three differential signals.
Figure 9B:
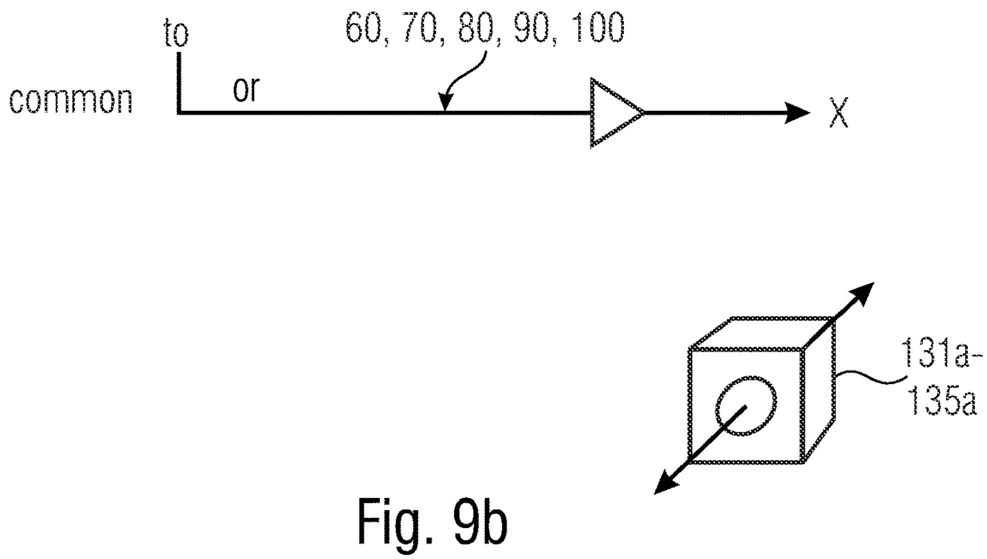
FIG. 9*b* shows a transducer arrangement having a transducer for the conventional common mode or CM signal.

Loudspeakers as known, for example, from EP 269244 B1 have respective inputs for the respective acoustic transducers. The transducer for the translation signal, i.e., for the first electric signal representing a common mode signal is illustrated in FIG. 9*b* by 131*a* to 135*a*. This transducer or the respective loudspeaker means obtains a respective signal, namely the signal 60, 70, 80, 90, 100, that can possibly be amplified, as also illustrated in FIG. 9*b*. The second loudspeaker means for the differential signal has only a single signal in the loudspeaker for the differential signal in the loudspeaker illustrated in the known technology. In embodiments of the present invention, the rotational vibration becomes more accurate by two or even three differential signals and is hence also recorded and reproduced for improved audio quality. Thus, each loudspeaker for the differential signal transducers receives two or even three individual signals that can be output to respective transducers as illustrated in FIG. 9*a*. In that way, the second loudspeaker means has two transducers 170*a* for the x-direction, i.e., for the Diffx differential signal. For the y differential signal Diffy, two transducers 170*b* are provided that are arranged opposite each other in the schematic cube shown in FIG. 9*a*. For the Diffz signal, the second loudspeaker means has two transducers 170*c* to reproduce the z-component of the rotational vibration. Thus, with "full equipment" in FIG. 9*a*, the second loudspeaker means has at least six individual diaphragms typically without housing, wherein a pair of opposite diaphragms is fed with the respective x, y, z-differential signal.

Depending on the implementation, the respective electric signals that are received by the interface 110 can also be output directly via loudspeaker, i.e., without using a renderer 120. In that case, for example, a respective microphone can be placed at each "loudspeaker position" in a studio environment. Then, for each microphone position, a microphone signal is obtained, which can then be reproduced via a loudspeaker in a reproduction scenario, which would be arranged at a position in the auditorium corresponding to the microphone position. Then, no renderer 120 is needed. Instead, the signals fed into the interface 110 would be fed directly or possibly after amplification into the loudspeakers, as shown in FIGS. 9*a* and 9*b* by the respective “or” alternative, where the electric signals are directly provided to the amplifiers in FIG. 9*a* or the amplifier in FIG. 9*b*, wherein the output signals of the respective amplifiers are then supplied to the transducers in FIG. 9*a* for the differential signals and in FIG. 9*b* for the common mode signals.

In one embodiment, the first loudspeaker means that is implemented in each of the five loudspeakers 131, 132, 133, 134, 135 is configured to comprise a first transducer for acoustic reproduction of the electric common mode signal, wherein the first transducer is configured to emit in a first direction. The second loudspeaker means includes a second transducer for acoustic reproduction of the first differential signal, wherein the second transducer is configured to emit in a second direction differing from the first direction. Above that, the second loudspeaker means also comprises a third transducer for acoustically transducing the second differential signal, wherein the third transducer is configured to emit in a third direction differing from the first and the second direction or differing from the second direction and being essentially equal to the first direction. This implementation also includes the case that the rotational vibration has a component in the direction in which the conventional translational vibration takes place.

As shown in FIG. 6, the interface includes three electrical differential signals 21, 22, 23 that are referred to as second electric signal, third electric signal and fourth electric signal. Alternatively, the interface can also obtain only two electric signals as differential signals, such that the rotational vibration can be reproduced correctly at least in two-dimensional direction. The same applies for the microphone means of FIG. 4. The same can also include merely two partial microphones in two spatial directions to obtain a correct recording of the differential signal at least two-dimensionally.

Figure 11:
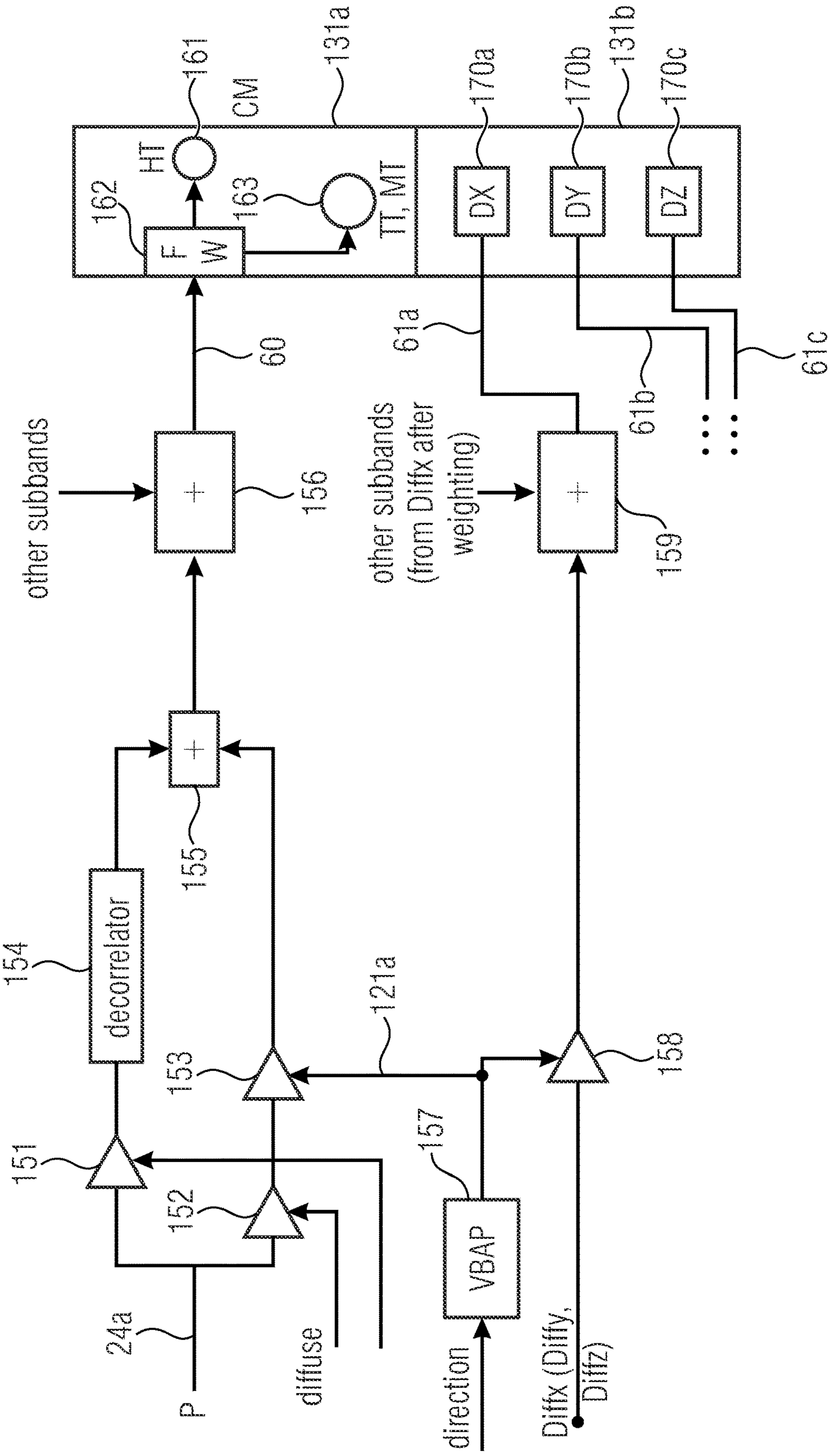
FIG. 11 shows a renderer for a reproduction apparatus or a mobile device according to a further embodiment having a loudspeaker implementation.

Depending on the implementation, the first loudspeaker means is provided with a frequency-separating means 162, a tweeter 161 and a woofer or midrange speaker 163 as illustrated at 131*a* in FIG. 11 for the common mode signal, i.e., for the conventional audio signal. This means that also the first loudspeaker means can have several different transducers that are all fed by one and the same common mode signal 24, for example one and the same common mode signal 60, 70, 80, 90, 100 of FIG. 6 (apart from frequency separation across the frequency-separating means 162).

The individual differential transducers 170*a*, 170*b*, 170*c*, indicated at 131*b* in FIG. 11 or in FIG. 9*b* are fed with different signals that have not been generated by frequency division or the same, but that have advantageously been recorded separately and are reproduced separately, either directly or by independent separate rendering. Thus, advantageously, no mixing between the differential signals takes place on the path from the recording to the reproduction, but merely rendering, i.e., for example, providing with respective panning weights as will be illustrated with reference to FIGS. 10 and 11. Above that, no mixing takes place in the reproduction or in the renderer 120 of the common mode signal on the one hand, and one or several differential signals on the other hand. Instead, the respective signals are routed separately to the respective transducers and superposition of the acoustic output signals only takes place in the sound field that is generated by one or several of the loudspeakers 131, 132, 133, 134, 135 as illustrated in FIG. 6.

Figure 8:
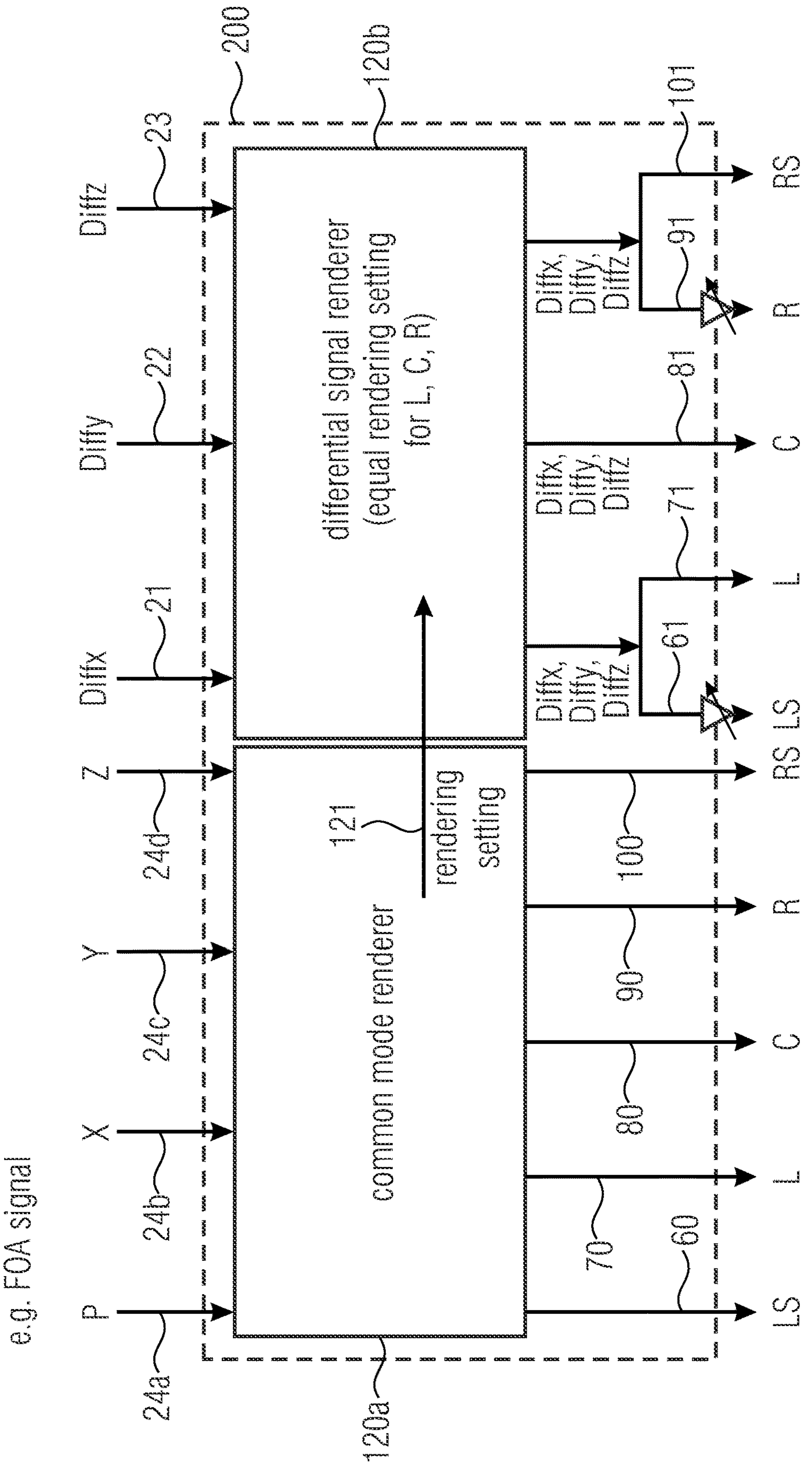
FIG. 8 shows a renderer for a reproduction apparatus or a mobile device according to an embodiment.

FIG. 8 shows a detailed representation of the renderer 120 with a common mode renderer 120*a* and a differential signal renderer 120*b*. The common mode renderer includes either merely the omnidirectional electric signal 24*a* or the full FOA or B-format signal with the X-component 24*b*, the Y-component 24*c* and the Z-component 24*d*.

Figure 10:
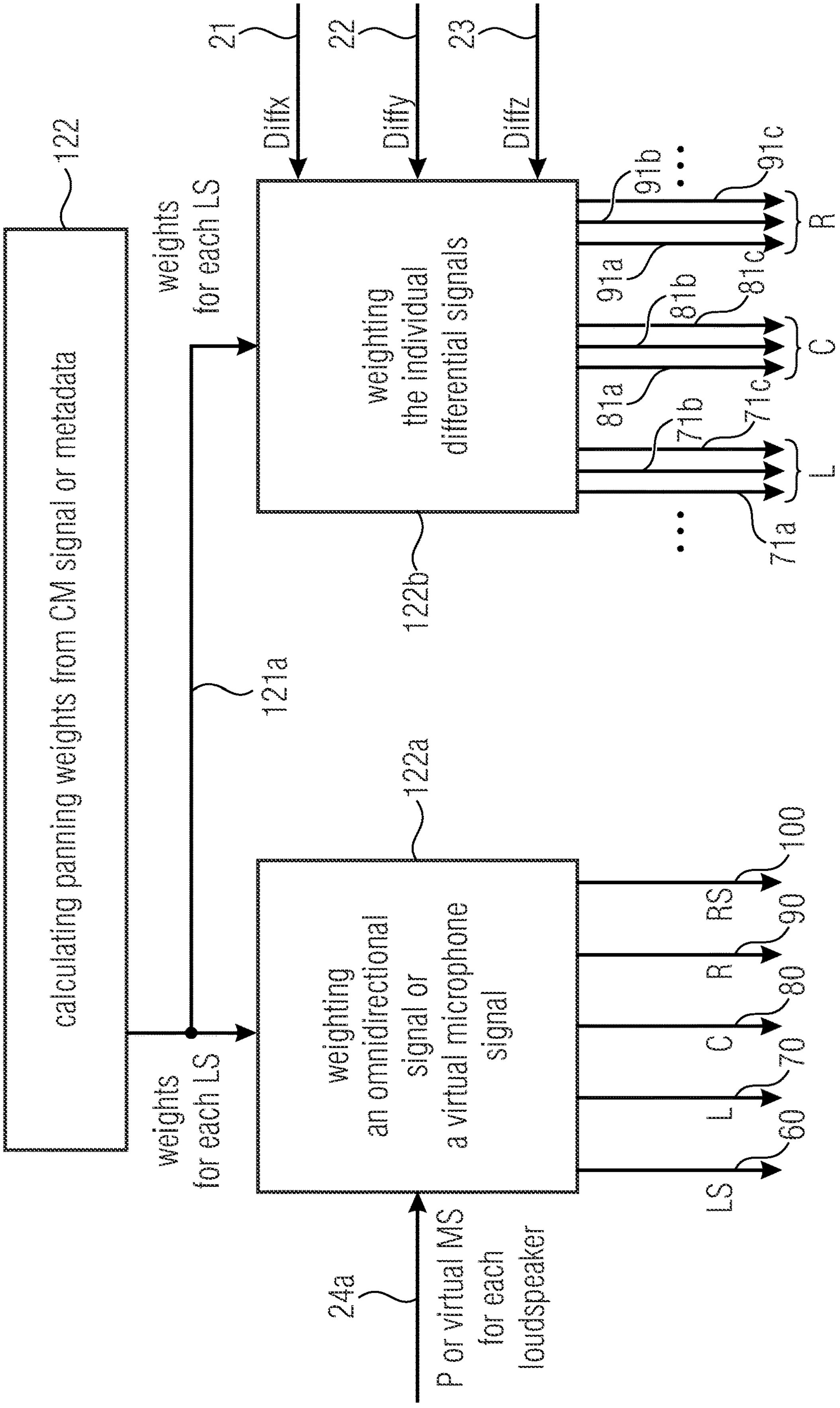
FIG. 10 shows a renderer for a reproduction apparatus or a mobile device according to a further embodiment.

On the other hand, the differential signal renderer obtains merely the differential signals in x-direction 20, in y-direction 22 and z-direction 23. Above that, the differential signal renderer is provided with the rendering setting 121 that the common mode renderer has determined from the B-format signals for a specific reproduction arrangement. Therefore, rendering the differential signals is efficiently possible as it takes place with the same rendering settings 121 and in particular with respective panning weights 121*a* as illustrated in FIG. 10. Thus, no separate determination of rendering weights has to take place. Instead, the differential signals 21, 22, 23 are “treated” in the same way as the omnidirectional signal 24*a*, i.e., the common mode signal in FIG. 8.

Further, in contrast to rendering for the common mode signal, for reducing the effort, it is of advantage that the differential signal renderer merely generates a rendered left differential signal, a rendered central differential signal and a rendered right differential signal and that then the rendered differential signal for rear left (LS) and rear right (RS) is derived from the rendering signal for left or from the rendered signal for right. A possible way of generating consists in the embodiment of FIG. 8 in simply copying the signal and an amplification setting of the signal for left rear and right rear, wherein this amplification setting can be an attenuation or an amplification, depending on the implementation, wherein attenuation is of advantage to concentrate the effect of the rotational sound field on the front channels L, C, R.

FIG. 10 shows an embodiment of the renderer 120 of FIG. 6 or 120*a*, 120*b* of FIG. 8. In a block 122 of FIG. 10, the panning weights are determined from the common mode signals or metadata connected to the common mode signals. For determining these panning weights, the position of a sound source in the common mode signal is determined with respect to a microphone position. Then, by using a position of a loudspeaker or of several loudspeakers in an auditorium and by using the (virtual) position of the microphone in the auditorium, the sound source is “placed” anywhere in the auditorium in the common mode signal, advantageously via vector-based amplitude panning. For this, the signal allocated to the sound source is provided with a weighting factor to obtain a respective signal. A sound source to be placed between left and center is mapped such that a panning factor for the omnidirectional signal for the left loudspeaker equals 0.5 and for the right loudspeaker also 0.5. When both loudspeaker signals are transduced, the sound source appears actually as “phantom source” between left and center. The same process is applied accordingly for other sound sources in the signals.

Separating the common mode signal in individual sound sources can be performed by any source separation algorithms. An advantageous embodiment is to subject the signal to a time-frequency transformation, wherein a plurality of subbands is generated for a sequence of subsequent frames, and wherein it is then determined, per time-frequency bin of the sequence of frames, from what direction the sound in a microphone signal originates. This determination of the direction can be obtained by simply reading out already provided metadata that indicate a DOA direction with an azimuth angle and an elevation angle per time-frequency bin. Additionally, depending on the implementation, diffuseness information can be provided in addition to the DOA information per time-frequency bin as is known from audio signal processing that is known among persons skilled in the art by the name DAC (directional audio coding).

If, however, no such metadata exists, but a full B-format signal as discussed based on FIG. 7 in 24*a*, 24*b*, 24*c*, 24*d*, by using a signal analysis, this direction information can be determined in each frame per time-frequency bin, i.e., per subband as presented in the publication "Parametric Spatial Audio Effects", A. Politis, u. a., $15^{th}$ Int. Conference on Digital Audio Effects (DAFx-12), Sep. 17, 2012, or in the publication "Directional audio coding—perception-based reproduction of spatial sound", V. Pulkki, et. al., International Workshop on the Principles and Applications of Spatial Hearing, IWPASH, Nov. 11, 2009, Japan. The presented processing corresponds, for the common mode signal, schematically to the audio processing in FIG. 11. By using a VBAP table 157, depending on the respective directional information illustrated by "direction" in FIG. 11, the panning weights are determined per loudspeaker signal P indicated by 24*a*. Here, the signal 24*a* can be the omnidirectional signal or a virtual microphone signal derived for the respective loudspeaker. This signal is then provided with the respective panning weighting block 157 in response to the respective DOA (direction of arrival) direction in the weighing means 153. Above that, a diffuse signal is generated, wherein for this the upper branch is used that comprises a decorrelator 154. The portion of the diffuse signal is adjusted by the two weights 151, 152 in dependence on the diffuseness information. Both branches, the "diffuse branch" and the "direct branch" are added in an adder 155. This processing is performed individually for each subband, and in a further adder 156, all other respectively processed subbands are added up to obtain a loudspeaker signal for the first loudspeaker means, which is exemplarily illustrated in FIG. 11 with 60 for the left rear channel that can, as already stated above, comprise a tweeter 161 and a woofer or midrange speaker 163.

Thus, in this embodiment, processing the upper half of FIG. 11 corresponds to the functionality of the common mode renderer 120*a* of FIG. 8, wherein the rendering setting 121 corresponds to the panning weights that are output by block VBAP 157. Exactly these panning weights 121*a* are also used to render the individual differential signal. For this, every differential signal is actually treated in the same way as the omnidirectional signal 24*a*, i.e., with a weighing means 158 that operates controlled by the panning weights, and in an adder 159, adding of accordingly weighted other subbands of the same differential signal takes place to generate, e.g., for the left rear loudspeaker, the differential signal for the X-direction, i.e., 61*a*. The same is performed accordingly to generate the differential signals 61*b*, 61*c* for the Y-transducers and the Z-transducers.

Depending on the implementation, the renderer 120 can be implemented together with the interface 121, for example, in a mobile phone software or generally in a mobile device, wherein the signals for the individual loudspeakers 131, 132, 133, 134, 135 can be provided, for example, via wireless transmission to the respective loudspeakers. The mobile device is, indicated, for example as 200 in FIG. 6 and would comprise, in addition to the elements 110 and 120, all other elements of a mobile device, such as a processer, a memory, different wireless interfaces, an accumulator, etc. Alternatively, a central unit can be provided that comprises an interface, independent of a mobile phone, to obtain the signals 21, 22, 23, 24 from any source and that is configured to provide the respective renderer output signals 60 to 101 to the respective loudspeakers via lines. As a further alternative, the interface itself and a respective renderer for the respective loudspeaker can be implemented in the loudspeaker 131, 132, 133, 134, 135 itself, wherein in this case, each loudspeaker would comprise a voltage supply and the respective input for the signals, i.e., the interface 110.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus. Some or all of the method steps may be performed by a hardware apparatus (or using a hardware apparatus), such as a microprocessor, a programmable computer or an electronic circuit. In some embodiments, some or several of the most important method steps may be performed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine readable carrier.

Other embodiments comprise the computer program for performing one of the methods described herein, wherein the computer program is stored on a machine readable carrier.

In other words, an embodiment of the inventive method is, therefore, a computer program comprising a program code for performing one of the methods described herein, when the computer program runs on a computer.

A further embodiment of the inventive method is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment in accordance with the invention includes an apparatus or a system configured to transmit a computer program for performing at least one of the methods described herein to a receiver. The transmission may be electronic or optical, for example. The receiver may be a computer, a mobile device, a memory device or a similar device, for example. The apparatus or the system may include a file server for transmitting the computer program to the receiver, for example.

In some embodiments, a programmable logic device (for example a field programmable gate array, FPGA) may be used to perform some or all of the functionalities of the methods described herein. In some embodiments, a field programmable gate array may cooperate with a microprocessor in order to perform one of the methods described herein. Generally, the methods may be performed by any hardware apparatus. This can be a universally applicable hardware, such as a computer processor (CPU) or hardware specific for the method, such as ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A microphone, comprising:

a first partial microphone with a first diaphragm pair comprising a first diaphragm and a second diaphragm that are arranged opposite to each other, wherein the first diaphragm pair is arranged such that the first diaphragm and the second diaphragm are deflectable along a first spatial axis, wherein the first spatial axis comprises an x-direction;

a second partial microphone with a second diaphragm pair comprising a third diaphragm and a fourth diaphragm that are arranged opposite to each other, wherein the second diaphragm pair is arranged such that the third diaphragm and the fourth diaphragm are deflectable along a second spatial axis, wherein the second spatial axis comprises an y-direction;

a third partial microphone with a third diaphragm pair comprising a fifth diaphragm and a sixth diaphragm that are arranged opposite to each other, wherein the third diaphragm pair is arranged such that the fifth diaphragm and the sixth diaphragm are deflectable along a third spatial axis, wherein the third spatial axis comprises a z-direction, wherein the x-direction, the y-direction and the z-direction are essentially orthogonal to one another, wherein the first partial microphone is configured to provide a first diaphragm signal in response to a deflection of the first diaphragm and to provide a second diaphragm signal in response to a deflection of the second diaphragm, wherein the first diaphragm signal and the second diaphragm signal comprise a first phase relation, wherein the first partial microphone is configured to combine the first diaphragm signal and the second diaphragm signal with a modified first phase relation to provide a first differential output signal allocated to the first spatial axis, wherein the second partial microphone is configured to provide a third diaphragm signal in response to a deflection of the third diaphragm and to provide a fourth diaphragm signal in response to a deflection of the fourth diaphragm, wherein the third diaphragm signal and the fourth diaphragm signal comprise a second phase relation to one another, and wherein the second partial microphone is configured to combine the third diaphragm signal and the fourth diaphragm signal with a modified second phase relation to provide a second differential output signal allocated to the second spatial axis, wherein the third partial microphone is configured to provide a fifth diaphragm signal in response to a deflection of the fifth diaphragm and to provide a sixth diaphragm signal in response to a deflection of a sixth diaphragm, wherein the fifth diaphragm signal and the sixth diaphragm signal comprise a third phase relation, and wherein the third partial microphone is configured to combine the fifth diaphragm signal and the sixth diaphragm signal with a modified third phase relation to provide a third differential output signal allocated to the third spatial axis, wherein the third partial microphone is configured to only add the fifth diaphragm signal and the sixth diaphragm signal in the third phase relation to provide a single omnidirectional common mode output signal, and wherein the first differential output signal, the second differential output signal, the third differential output signal, and the single omnidirectional common mode output signal form an output of the microphone.

2. The microphone according to claim 1, wherein the diaphragms of the first diaphragm pair, the second diaphragm pair or the third diaphragm pair are arranged directly opposite to each other, parallel to another, aligned with one another or at a distance of less than 2 cm of one another.

3. The microphone according to claim 1, wherein the modified first phase relation differs from the first phase relation by 180° or differs from the first phase relation by a phase between 150° and 210°, wherein the modified second or third phase relation differs from the second or third phase relation by 180° or from the second or third phase relation by a phase between 150° and 210°.

4. The microphone according to claim 1, wherein the first diaphragm signal is transmitted as a symmetrical signal on a first positive line and a first negative line, wherein the second diaphragm signal is transmitted as a symmetrical signal on a second positive line and a first negative line, wherein the first partial microphone comprises a combiner with a first positive input and a first negative input for the first diaphragm signal and with a second positive input and a second negative input for the second diaphragm signal, wherein the second negative line of the second diaphragm signal is connected to the second positive input of the combiner and wherein the second positive line of the second diaphragm signal is connected to the second negative input of the combiner, and wherein the first positive line of the first diaphragm signal is connected to the first positive input of the combiner and wherein the first negative line of the first diaphragm signal is connected to the first negative input of the combiner.

5. The microphone according to claim 1, wherein the first partial microphone comprises a first capacitor microphone comprising the first diaphragm and the counterelectrode, and wherein the first partial microphone comprises a second capacitor microphone comprising the second diaphragm and the second counterelectrode or wherein the second partial microphone comprises a third capacitor microphone that comprises a third diaphragm and a counterelectrode, and a fourth capacitor microphone that comprises the fourth diaphragm and the fourth counterelectrode, or wherein the third partial microphone comprises a fifth capacitor microphone that comprises a fifth diaphragm and a counterelectrode, and a sixth capacitor microphone that comprises the sixth diaphragm and a counterelectrode.

6. The microphone according to claim 1, wherein the first, the second or the third, the fourth or the fifth and the sixth capacitor microphone are configured as a capacitor or an electret microphone, wherein a capacitor or electret foil is deposited on the respective counterelectrode.

7. The microphone according to claim 1, comprising a microphone holder, wherein the first partial microphone is housed in a first longitudinal housing, wherein the first diaphragm pair is arranged on a first housing tip, wherein the second partial microphone is housed in a second longitudinal housing, wherein the second diaphragm pair is arranged on a second housing tip, or wherein the third partial microphone is housed in a third longitudinal housing, wherein the third diaphragm pair is arranged on a third housing tip, wherein the diaphragm holder is configured to hold the first longitudinal housing, the second longitudinal housing and the third longitudinal housing such that the first housing tip, the second housing tip and the third housing tip are aligned to one another and an angle between 70° and 110° lies between a first axis of the first longitudinal housing and a second axis of the second longitudinal housing, or wherein an angle between 30° and 160° lies between a third axis of the third longitudinal housing and the first and/or the second axis, or wherein a distance of less than 5 cm exists between the first housing tip, the second housing tip and the third housing tip.

8. The microphone according to claim 7, wherein the diaphragm holder comprises a flat carrier comprising a triangular shape or kite shape, wherein laterally projecting holders for the first longitudinal housing and the second longitudinal housing are arranged on two sides of the flat carrier, and wherein a third holder projecting towards the top is arranged perpendicularly to the first holder and a second holder in a central axis of the flat carrier.

9. The microphone according to claim 8, wherein the first holder, the second holder or the third holder comprises open elastic clips on one side, to which the respective longitudinal housing can be mounted without any tools.

10. A method for recording an acoustic signal, comprising:

operating a first partial microphone with a first diaphragm pair comprising a first diaphragm and a second diaphragm that are arranged opposite to each other, wherein the first diaphragm pair is arranged such that the first diaphragm and the second diaphragm are deflectable along a first spatial axis, wherein the first spatial axis comprises an x-direction;

operating a second partial microphone with a second diaphragm pair comprising a third diaphragm and a fourth diaphragm that are arranged opposite to each other, wherein the second diaphragm pair is arranged such that the third diaphragm and the fourth diaphragm are deflectable along a second spatial axis, wherein the second spatial axis comprises an y-direction;

operating a third partial microphone with a third diaphragm pair comprising a fifth diaphragm and a sixth diaphragm that are arranged opposite to each other, wherein the third diaphragm pair is arranged such that the fifth diaphragm and the sixth diaphragm are deflectable along a third spatial axis, wherein the third spatial axis comprises a z-direction, wherein the x-direction, the y-direction and the z-direction are essentially orthogonal to one another, providing a first diaphragm signal in response to a deflection of the first diaphragm, providing a second diaphragm signal in response to a deflection of the second diaphragm, wherein the first diaphragm signal and the second diaphragm signal comprise a first phase relation, and combining the first diaphragm signal and the second diaphragm signal with a modified first phase relation to provide a first differential output signal allocated to the first spatial axis;

providing a third diaphragm signal in response to a deflection of the third diaphragm, providing a fourth diaphragm signal in response to a deflection of the fourth diaphragm, wherein the third diaphragm signal and the fourth diaphragm signal comprise a second phase relation to one another, and combining the third diaphragm signal and the fourth diaphragm signal with a modified second phase relation to provide a second differential output signal allocated to the second spatial axis;

providing a fifth diaphragm signal in response to a deflection of the fifth diaphragm and providing a sixth diaphragm signal in response to a deflection of a sixth diaphragm, wherein the fifth diaphragm signal and the sixth diaphragm signal comprise a third phase relation, and combining the fifth diaphragm signal and the sixth diaphragm signal with a modified third phase relation to provide a third differential output signal allocated to the third spatial axis, wherein the only the fifth diaphragm signal and the sixth diaphragm signal are added in the third phase relation to provide a single omnidirectional common mode output signal, and wherein the first differential output signal, the second differential output signal, the third differential output signal, and the single omnidirectional common mode output signal form an output of the method.

11. A non-transitory digital storage medium having stored therein a computer program for performing, when the computer program is run by a computer or a processor, a method for recording an acoustic signal, the method comprising:

operating a first partial microphone with a first diaphragm pair comprising a first diaphragm and a second diaphragm that are arranged opposite to each other wherein the first diaphragm pair is arranged such that the first diaphragm and the second diaphragm are deflectable along a first spatial axis, wherein the first spatial axis comprises an x-direction;

operating a second partial microphone with a second diaphragm pair comprising a third diaphragm and a fourth diaphragm that are arranged opposite to each other, wherein the second diaphragm pair is arranged such that the third diaphragm and the fourth diaphragm are deflectable along a second spatial axis, wherein the second spatial axis comprises an y-direction;

operating a third partial microphone with a third diaphragm pair comprising a fifth diaphragm and a sixth diaphragm that are arranged opposite to each other, wherein the third diaphragm pair is arranged such that the fifth diaphragm and the sixth diaphragm are deflectable along a third spatial axis, wherein the third spatial axis comprises a z-direction, wherein the x-direction, the y-direction and the z-direction are essentially orthogonal to one another, providing a first diaphragm signal in response to a deflection of the first diaphragm, providing a second diaphragm signal in response to a deflection of the second diaphragm, wherein the first diaphragm signal and the second diaphragm signal comprise a first phase relation, and combining the first diaphragm signal and the second diaphragm signal with a modified first phase relation to provide a first differential output signal allocated to the first spatial axis;

providing a third diaphragm signal in response to a deflection of the third diaphragm, providing a fourth diaphragm signal in response to a deflection of the fourth diaphragm, wherein the third diaphragm signal and the fourth diaphragm signal comprise a second phase relation to one another, and combining the third diaphragm signal and the fourth diaphragm signal with a modified second phase relation to provide a second differential output signal allocated to the second spatial axis;

providing a fifth diaphragm signal in response to a deflection of the fifth diaphragm and providing a sixth diaphragm signal in response to a deflection of a sixth diaphragm, wherein the fifth diaphragm signal and the sixth diaphragm signal comprise a third phase relation, and combining the fifth diaphragm signal and the sixth diaphragm signal with a modified third phase relation to provide a third differential output signal allocated to the third spatial axis, wherein the only the fifth diaphragm signal and the sixth diaphragm signal are added in the third phase relation to provide a single omnidirectional common mode output signal, and wherein the first differential output signal, the second differential output signal, the third differential output signal, and the single omnidirectional common mode output signal form an output of the method.

* * * * *